United States Patent
Drumm

(10) Patent No.: US 9,524,060 B2
(45) Date of Patent: Dec. 20, 2016

(54) LOW POWER OPERATION OF AN OPTICAL TOUCH-SENSITIVE DEVICE FOR DETECTING MULTITOUCH EVENTS

(71) Applicant: Rapt IP Limited, Gibraltar (GI)

(72) Inventor: Owen Drumm, Dublin (IE)

(73) Assignee: Rapt IP Limited, Gibraltar (GI)

(*) Notice: Subject to any disclaimer, the term of this patent is extended or adjusted under 35 U.S.C. 154(b) by 241 days.

(21) Appl. No.: 13/938,888

(22) Filed: Jul. 10, 2013

(65) Prior Publication Data

US 2014/0015803 A1 Jan. 16, 2014

Related U.S. Application Data

(60) Provisional application No. 61/671,225, filed on Jul. 13, 2012.

(51) Int. Cl.
*G09G 5/00* (2006.01)
*G06F 3/042* (2006.01)

(52) U.S. Cl.
CPC ........... *G06F 3/0421* (2013.01); *G06F 3/0428* (2013.01)

(58) Field of Classification Search
CPC .. G09G 3/0421; G09G 3/0423; G09G 3/0425; G09G 3/0428
USPC .................................................. 345/173, 175
See application file for complete search history.

(56) References Cited

U.S. PATENT DOCUMENTS

| | | | |
|---|---|---|---|
| 4,067,925 A | 1/1978 | Zahner | |
| 4,097,732 A | 6/1978 | Krause et al. | |
| 4,198,623 A | 4/1980 | Misek et al. | |
| 4,243,879 A | 1/1981 | Carroll et al. | |
| 4,247,767 A | 1/1981 | O'Brien et al. | |
| 4,267,443 A | 5/1981 | Carroll et al. | |
| 4,301,447 A | 11/1981 | Funk et al. | |
| 4,305,071 A | 12/1981 | Bell et al. | |
| 4,313,109 A | 1/1982 | Funk et al. | |
| 4,374,381 A | 2/1983 | Ng et al. | |
| 4,384,201 A | 5/1983 | Carroll et al. | |
| 4,387,367 A | 6/1983 | Fisher | |
| 4,459,476 A | 7/1984 | Weissmueller et al. | |
| 4,467,193 A | 8/1984 | Carroll | |

(Continued)

FOREIGN PATENT DOCUMENTS

| | | |
|---|---|---|
| CN | 101598995 A | 12/2009 |
| CN | 201600672 U | 10/2010 |

(Continued)

OTHER PUBLICATIONS

Cummings, T.F., "Transparent Keyless Keyboard for Variable Terminal Applications," IBM Technical Disclosure Bulletin, Sep. 1977, pp. 1609-1611, vol. 20, No. 4.

(Continued)

*Primary Examiner* — Jennifer Nguyen
(74) *Attorney, Agent, or Firm* — Fenwick & West LLP

(57) ABSTRACT

An optical touch-sensitive device is able to determine the locations of multiple simultaneous touch events. The optical touch-sensitive device includes multiple emitters and detectors. Each emitter produces optical beams which are received by the detectors. Touch events disturb the optical beams. Detection schemes define the operation of the touch capability. Different detection schemes consume different amounts of power and may be used in combination to reduce overall power consumption.

24 Claims, 8 Drawing Sheets

(56) References Cited

U.S. PATENT DOCUMENTS

| | | |
|---|---|---|
| 4,635,032 A | 1/1987 | Virtanen |
| 4,636,632 A | 1/1987 | Ando |
| 4,645,920 A | 2/1987 | Carroll et al. |
| 4,672,364 A | 6/1987 | Lucas |
| 4,684,801 A | 8/1987 | Carroll et al. |
| 4,703,316 A | 10/1987 | Sherbeck |
| 4,710,759 A | 12/1987 | Fitzgibbon |
| 4,713,534 A | 12/1987 | Masters et al. |
| 4,746,770 A | 5/1988 | McAvinney |
| 4,761,637 A | 8/1988 | Lucas et al. |
| 4,782,327 A | 11/1988 | Kley et al. |
| 4,794,248 A | 12/1988 | Gray |
| 4,799,044 A | 1/1989 | Masters et al. |
| 4,818,859 A | 4/1989 | Hough |
| 4,847,606 A | 7/1989 | Beiswenger |
| 4,855,590 A | 8/1989 | Bures et al. |
| 4,893,120 A | 1/1990 | Doering et al. |
| 4,899,138 A | 2/1990 | Araki et al. |
| 4,904,857 A | 2/1990 | Ando et al. |
| 4,912,316 A | 3/1990 | Yamakawa |
| 4,943,806 A | 7/1990 | Masters et al. |
| 4,988,983 A | 1/1991 | Wehrer |
| 4,990,901 A | 2/1991 | Beiswenger |
| 5,136,156 A | 8/1992 | Nounen et al. |
| 5,146,081 A | 9/1992 | Heikkinen et al. |
| 5,355,149 A | 10/1994 | Casebolt |
| 5,414,413 A | 5/1995 | Tamaru et al. |
| 5,635,724 A | 6/1997 | Higgins |
| 6,429,857 B1 | 8/2002 | Masters et al. |
| 6,690,363 B2 | 2/2004 | Newton |
| 6,972,753 B1 | 12/2005 | Kimura et al. |
| 7,295,329 B2 | 11/2007 | Gruhlke et al. |
| 7,310,090 B2 | 12/2007 | Ho et al. |
| 7,435,940 B2 | 10/2008 | Eliasson et al. |
| 7,442,914 B2 | 10/2008 | Eliasson et al. |
| 7,465,914 B2 | 12/2008 | Eliasson et al. |
| 8,218,154 B2 | 7/2012 | Østergaard et al. |
| 8,654,100 B2* | 2/2014 | Nakajoh .............. G06F 3/0421 345/175 |
| 2001/0037186 A1 | 11/2001 | Kida et al. |
| 2004/0252091 A1 | 12/2004 | Ma et al. |
| 2005/0162398 A1 | 7/2005 | Eliasson et al. |
| 2006/0114237 A1 | 6/2006 | Crockett et al. |
| 2006/0227120 A1 | 10/2006 | Eikman |
| 2006/0255248 A1 | 11/2006 | Eliasson |
| 2007/0052693 A1* | 3/2007 | Watari ........................ 345/175 |
| 2007/0125937 A1 | 6/2007 | Eliasson et al. |
| 2007/0152985 A1 | 7/2007 | Østergaard et al. |
| 2007/0165008 A1 | 7/2007 | Crockett |
| 2007/0201042 A1 | 8/2007 | Eliasson et al. |
| 2008/0007540 A1 | 1/2008 | Østergaard |
| 2008/0007542 A1 | 1/2008 | Eliasson et al. |
| 2008/0088603 A1 | 4/2008 | Eliasson et al. |
| 2008/0189046 A1 | 8/2008 | Eliasson et al. |
| 2009/0122020 A1 | 5/2009 | Eliasson et al. |
| 2009/0273794 A1 | 11/2009 | Østergaard et al. |
| 2010/0134447 A1* | 6/2010 | Nakajoh .............. G06F 3/0421 345/175 |
| 2010/0193259 A1 | 8/2010 | Wassvik |
| 2011/0074734 A1 | 3/2011 | Wassvik et al. |
| 2011/0074735 A1 | 3/2011 | Wassvik et al. |
| 2011/0090176 A1 | 4/2011 | Christiansson et al. |
| 2011/0102374 A1 | 5/2011 | Wassvik et al. |
| 2011/0216042 A1 | 9/2011 | Wassvik et al. |
| 2011/0227874 A1 | 9/2011 | Fåhraeus et al. |
| 2011/0279412 A1 | 11/2011 | Chen et al. |
| 2012/0068973 A1 | 3/2012 | Christiansson et al. |
| 2012/0153134 A1 | 6/2012 | Bergström et al. |
| 2012/0154338 A1 | 6/2012 | Bergström et al. |
| 2012/0162142 A1 | 6/2012 | Christiansson et al. |
| 2012/0162144 A1 | 6/2012 | Fåhraeus et al. |
| 2012/0169672 A1 | 7/2012 | Christiansson |
| 2012/0176343 A1 | 7/2012 | Holmgren et al. |
| 2012/0200537 A1 | 8/2012 | Okano |
| 2012/0200538 A1 | 8/2012 | Christiansson et al. |
| 2012/0212441 A1 | 8/2012 | Christiansson et al. |
| 2012/0256882 A1 | 10/2012 | Christiansson et al. |
| 2012/0262408 A1* | 10/2012 | Pasquero .............. G06F 3/0412 345/174 |
| 2012/0268403 A1 | 10/2012 | Christiansson |
| 2013/0021300 A1 | 1/2013 | Wassvik |
| 2013/0044073 A1 | 2/2013 | Christiansson et al. |

FOREIGN PATENT DOCUMENTS

| | | |
|---|---|---|
| CN | 102043546 A | 5/2011 |
| CN | 102411457 A | 4/2012 |
| CN | 102455826 A | 5/2012 |
| CN | 102541364 A | 7/2012 |
| EP | 0304820 A2 | 3/1989 |
| EP | 0601651 | 6/1994 |
| GB | 2133537 | 7/1984 |
| GB | 2171195 A | 8/1986 |
| TW | 201140400 A | 11/2011 |
| WO | WO 01/40922 A2 | 6/2001 |
| WO | WO 02/095668 A1 | 11/2002 |
| WO | WO 2007/003196 A2 | 1/2007 |
| WO | WO 2008/004103 A2 | 1/2008 |
| WO | WO 2011/048655 A1 | 4/2011 |

OTHER PUBLICATIONS

Baumann, D.D., "Optical Data Input Device," IBM Technical Disclosure Bulletin, Mar. 1969, pp. 1281-1282, vol. 11, No. 10.

Thompson, D.R., "Finger Position Detect Method," IBM Technical Disclosure Bulletin, Dec. 1980, p. 3289, vol. 23, No. 7B.

Callens, P., "Optical Keyboard Device and Technique," IBM Technical Disclosure Bulletin, Nov. 1983, pp. 2763-2764, vol. 26, No. 6.

"Enhanced Optical Touch Input Panel," IBM Technical Disclosure Bulletin, Sep. 1985, pp. 1760-1762, vol. 28, No. 4.

PCT International Search Report and Written Opinion, PCT Application No. PCT/IB2013/002010, Jan. 29, 2014, 10 pages.

Chinese First Office Action, Chinese Application No. 201380047608.3, Aug. 22, 2016, 24 pages.

* cited by examiner

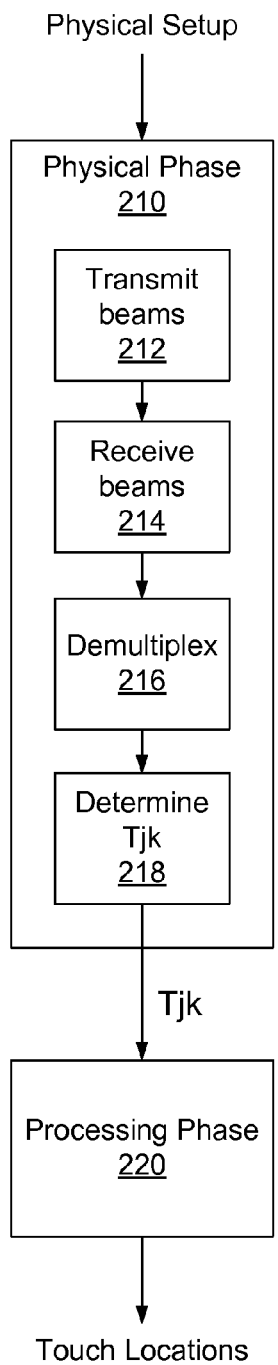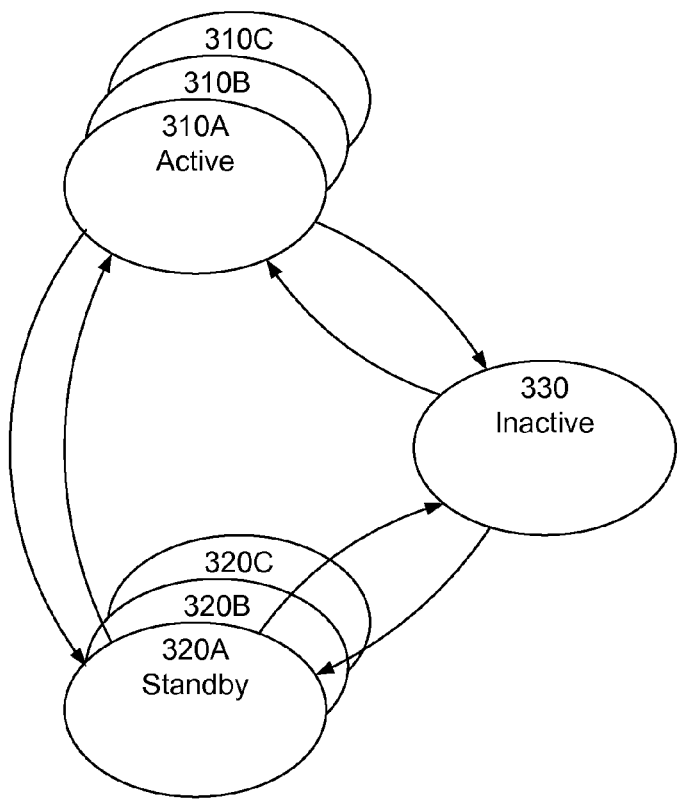
FIG. 2
FIG. 3

LOW POWER OPERATION OF AN OPTICAL TOUCH-SENSITIVE DEVICE FOR DETECTING MULTITOUCH EVENTS

CROSS REFERENCE TO RELATED APPLICATION

This application claims priority under 35 U.S.C. §119(e) from Provisional Application Ser. No. 61/671,225, filed Jul. 13, 2012, which is incorporated by reference herein.

BACKGROUND

1. Field of Art

This invention generally relates to detecting touch events in a touch-sensitive device, especially low power approaches capable of detecting multitouch events.

2. Description of the Related Art

Touch-sensitive displays for interacting with computing devices are becoming more common. A number of different technologies exist for implementing touch-sensitive displays and other touch-sensitive devices. Examples of these techniques include, for example, resistive touch screens, surface acoustic wave touch screens, capacitive touch screens and certain types of optical touch screens.

However, many of these approaches currently suffer from drawbacks. For example, some technologies may function well for small sized displays, as used in many modern mobile phones, but do not scale well to larger screen sizes as in displays used with laptop or even desktop computers. Another drawback for some technologies is their inability or difficulty in handling multitouch events. A multitouch event occurs when multiple touch events occur simultaneously. Another drawback is that technologies may not be able to meet increasing resolution demands.

Another drawback is power consumption. Many touch-sensitive devices are mobile devices, such as mobile phones, laptop computers and tablet computers, where power consumption is an important factor. Furthermore, larger screen size, faster device operation, higher device resolution and multitouch detection are device requirements that can increase power consumption. Power consumption may be a determining factor as to whether a touch-sensitive device is commercially viable.

Thus, there is a need for lower power touch-sensitive systems.

SUMMARY

An optical touch-sensitive device is able to detect and determine the locations of multiple simultaneous touch events. This may also be referred to as touch event resolution. The optical touch-sensitive device includes multiple emitters and detectors. The emitters produce optical beams which are received by the detectors. The optical beams preferably are multiplexed in a manner so that many optical beams can be received by a detector simultaneously. Touch events disturb the optical beams.

The device is operated in a manner that conserves power. For example, the device may have different operating modes (active, standby, high-resolution, high-speed, software-driven, etc.), which consume different amounts of power. By switching between different operating modes, overall power consumption can be reduced.

Even within an operating mode, a device may have multiple detection schemes available, which consume different amounts of power. For example, detection schemes may differ in the amount of power or energy applied to beams; the scan rate; the resolution; the selection of which beams, emitters or detectors to activate; the scan area; the density of beams; the multiplexing scheme and/or the type of processing used to determine touch events. By combining different detection schemes, overall power consumption can be reduced.

Other aspects include methods, devices, systems and software related to the above.

BRIEF DESCRIPTION OF DRAWINGS

Embodiments of the present invention will now be described, by way of example, with reference to the accompanying drawings, in which:

FIG. 2 is a flow diagram for determining the locations of touch events, according to one embodiment.

FIG. 3 is a state diagram illustrating different operating modes for a touch-sensitive device.

DETAILED DESCRIPTION

I. Introduction

A. Device Overview

Figure 1:
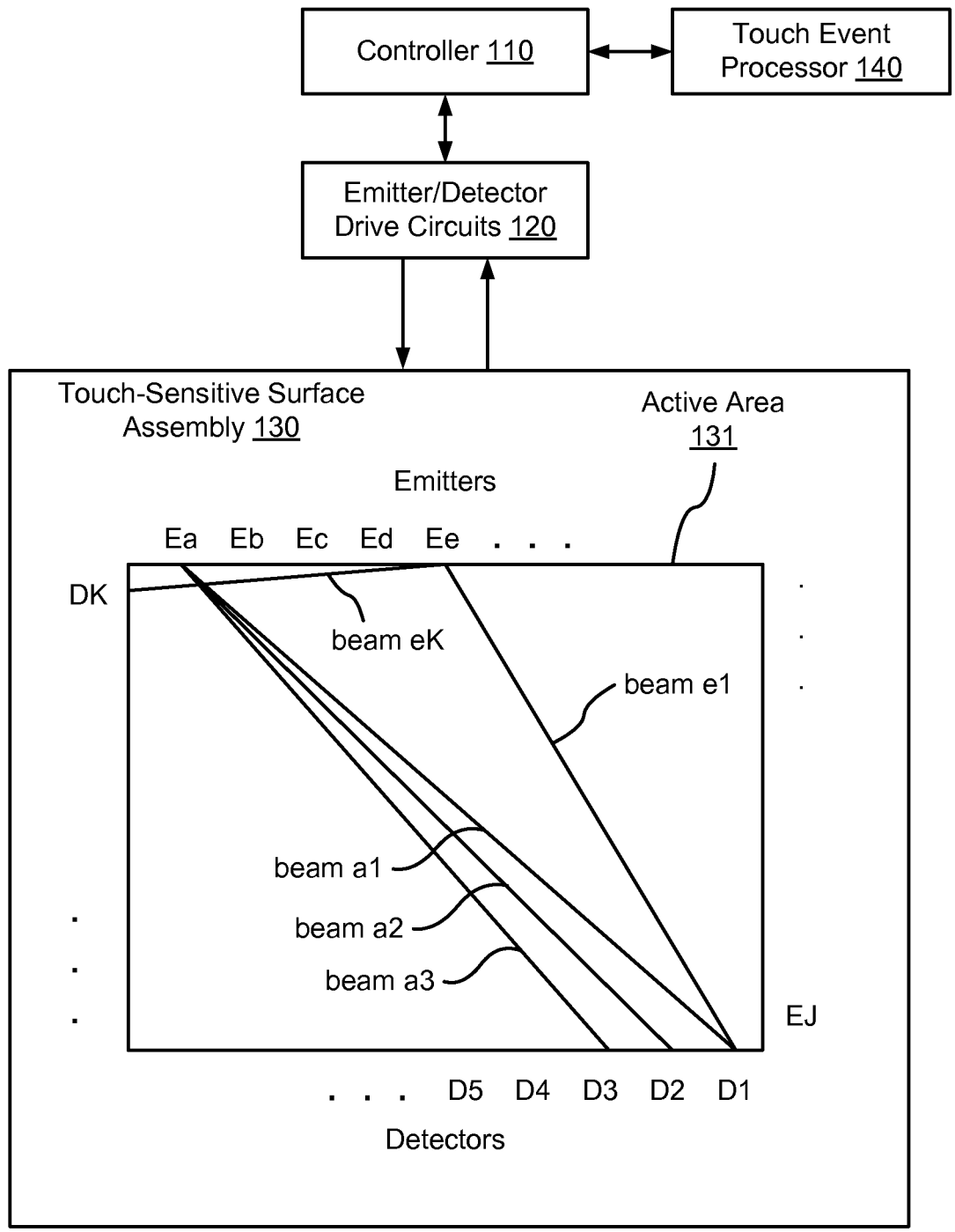
FIG. 1 is a diagram of an optical touch-sensitive device, according to one embodiment.

FIG. 1 is a diagram of an optical touch-sensitive device, according to one embodiment. The optical touch-sensitive device includes a controller 110, emitter/detector drive circuits 120, and a touch-sensitive surface assembly 130. The surface assembly 130 includes a surface 131 over which touch events are to be detected. For convenience, the area defined by surface 131 may sometimes be referred to as the active area or active surface, even though the surface itself may be an entirely passive structure. The assembly 130 also includes emitters and detectors arranged along the periphery of the active surface 131. In this example, there are J emitters labeled as Ea-EJ and K detectors labeled as D1-DK. The device also includes a touch event processor 140, which may be implemented as part of the controller 110 or separately as shown in FIG. 1. A standardized API may be used to communicate with the touch event processor 140, for example between the touch event processor 140 and controller 110, or between the touch event processor 140 and other devices connected to the touch event processor.

The emitter/detector drive circuits 120 serve as an interface between the controller 110 and the emitters Ej and detectors Dk. The emitters produce optical "beams" which are received by the detectors. Preferably, the light produced by one emitter is received by more than one detector, and each detector receives light from more than one emitter. For convenience, "beam" will refer to the light from one emitter to one detector, even though it may be part of a large fan of light that goes to many detectors rather than a separate beam. The beam from emitter Ej to detector Dk will be referred to as beam jk. FIG. 1 expressly labels beams a1, a2, a3, e1 and eK as examples. Touches within the active area 131 will disturb certain beams, thus changing what is received at the detectors Dk. Data about these changes is communicated to the touch event processor 140, which analyzes the data to determine the location(s) (and times) of touch events on surface 131.

B. Process Overview

FIG. 2 is a flow diagram for determining the locations of touch events, according to one embodiment. This process will be illustrated using the device of FIG. 1. The process is roughly divided into two phases, which will be referred to as a physical (or scanning) phase 210 and a processing phase 220. Conceptually, the dividing line between the two phases is a set of transmission coefficients Tjk.

The transmission coefficient Tjk is the transmittance of the optical beam from emitter j to detector k, compared to what would have been transmitted if there was no touch event interacting with the optical beam. The use of this specific measure is purely an example. Other measures can be used. In addition, although FIG. 2 is explained using Tjk as the dividing line between the physical phase 210 and the processing phase 220, it is not required that Tjk be expressly calculated. Nor is a clear division between the physical phase 210 and processing phase 220 required.

Returning to FIG. 2, the physical phase 210 is the process of determining the Tjk from the physical setup. The processing phase 220 determines the touch events from the Tjk. The model shown in FIG. 2 is conceptually useful because it somewhat separates the physical setup and underlying physical mechanisms from the subsequent processing.

For example, the physical phase 210 produces transmission coefficients Tjk. Many different physical designs for the touch-sensitive surface assembly 130 are possible, and different design tradeoffs will be considered depending on the end application. For example, the emitters and detectors may be narrower or wider, narrower angle or wider angle, various wavelengths, various powers, coherent or not, etc. As another example, different types of multiplexing may be used to allow beams from multiple emitters to be received by each detector. Several of these physical setups and manners of operation are described below, primarily in Section C below.

The interior of block 210 shows one possible implementation of process 210. In this example, emitters transmit 212 beams to multiple detectors. Some of the beams travelling across the touch-sensitive surface are disturbed by touch events. The detectors receive 214 the beams from the emitters in a multiplexed optical form. The received beams are de-multiplexed 216 to distinguish individual beams jk from each other. Transmission coefficients Tjk for each individual beam jk are then determined 218.

The processing phase 220 can also be implemented in many different ways. Candidate touch points, line imaging, location interpolation, touch event templates and multi-pass approaches are all examples of techniques that may be used as part of the processing phase 220. Several of these are described below, primarily in Section D below.

C. Physical Set-Up

The touch-sensitive device may be implemented in a number of different ways. The following are some examples of design variations.

Electronics. With respect to electronic aspects, note that FIG. 1 is exemplary and functional in nature. Functions from different boxes in FIG. 1 can be implemented together in the same component.

Touch Interactions. Different mechanisms for a touch interaction with an optical beam can be used. One example is frustrated total internal reflection (TIR). In frustrated TIR, an optical beam is confined to a waveguide by total internal reflection and the touch interaction disturbs the total internal reflection in some manner. Another example is beam blockage, where the touch interaction partially or fully blocks the optical beam. Other touch interactions can be based on changes in polarization, scattering, or in propagation direction or propagation angle (either vertically or horizontally).

The touch interactions can also be direct or indirect. In a direct interaction, the touching object (e.g., a finger or stylus) is the object that interacts with the optical beam. For example, a finger may have a higher index of refraction than air, thus frustrating TIR when the finger comes into direct contact with a waveguide. In an indirect interaction, the touching object interacts with an intermediate object, which interacts with the optical beam. For example, the finger may cause a high index object to come into contact with the waveguide, or may cause a change in the index of refraction of the waveguide or surrounding materials.

Note that some types of touch interactions can be used to measure contact pressure or touch velocity, in addition to the presence of touches. Also note that some touch mechanisms may enhance transmission, instead of or in addition to reducing transmission. For simplicity, in the remainder of this description, the touch mechanism will be assumed to be primarily of a blocking nature, meaning that a beam from an emitter to a detector will be partially or fully blocked by an intervening touch event. This is not required, but it is convenient to illustrate various concepts.

For convenience, the touch interaction mechanism may sometimes be classified as either binary or analog. A binary interaction is one that basically has two possible responses as a function of the touch. Examples includes non-blocking and fully blocking, or non-blocking and 10%+ attenuation, or not frustrated and frustrated TIR. An analog interaction is one that has a "grayscale" response to the touch: non-blocking passing through gradations of partially blocking to blocking Emitters, Detectors and Couplers. Each emitter transmits light to a number of detectors. Usually, each emitter outputs light to more than one detector simultaneously. Similarly, each detector receives light from a number of different emitters. The optical beams may be visible, infrared and/or ultraviolet light. The term "light" is meant to include all of these wavelengths and terms such as "optical" are to be interpreted accordingly.

Examples of the optical sources for the emitters include light emitting diodes (LEDs) and semiconductor lasers. IR sources can also be used. Modulation of the optical beams can be external or internal. Examples of sensor elements for the detector include charge coupled devices, photodiodes, photoresistors, phototransistors, and nonlinear all-optical detectors. The emitters and detectors may also include optics and/or electronics in addition to the main optical source and sensor element. In this disclosure, the optical paths will be shown unfolded for clarity. Various coupling approaches can be used, including waveguides, optical fibers and/or free space coupling.

Optical Beam Paths. Another aspect of a touch-sensitive system is the shape and location of the optical beams and beam paths. In FIGS. 1-2, the optical beams are shown as lines. These lines should be interpreted as representative of the beams, but the beams themselves may be different shapes and footprints. A point emitter and point detector produce a narrow "pencil" beam with a line-like footprint. A point emitter and wide detector (or vice versa) produces a fan-shaped beam with a triangular footprint. A wide emitter and wide detector produces a "rectangular" beam with a rectangular footprint of fairly constant width.

Depending on the width of the footprint, the transmission coefficient Tjk behaves as a binary or as an analog quantity. It is binary if the transmission coefficient transitions fairly abruptly from one extreme value to the other extreme value as a touch point passes through the beam. For example, if the beam is very narrow, it will either be fully block or fully unblocked. If the beam is wide, it may be partially blocked as the touch point passes through the beam, leading to a more analog behavior.

In most implementations, each emitter and each detector will support multiple beam paths, although there may not be a beam from each emitter to every detector. The aggregate of the footprints from all beams from one emitter will be referred to as that emitter's coverage area. The coverage areas for all emitters can be aggregated to obtain the overall coverage for the system.

The footprints of individual beams can be described using different quantities: spatial extent (i.e., width), angular extent (i.e., radiant angle for emitters, acceptance angle for detectors) and footprint shape. An individual beam path from one emitter to one detector can be described by the emitter's width, the detector's width and/or the angles and shape defining the beam path between the two. An emitter's coverage area can be described by the emitter's width, the aggregate width of the relevant detectors and/or the angles and shape defining the aggregate of the beam paths from the emitter. Note that the individual footprints may overlap. The ratio of (the sum of an emitter's footprints)/(emitter's cover area) is one measure of the amount of overlap.

The overall coverage area for all emitters should cover the entirety of the active area 131. However, not all points within the active area 131 will be covered equally. Some points may be traversed by many beam paths while other points traversed by far fewer. The distribution of beam paths over the active area 131 may be characterized by calculating how many beam paths traverse different (x, y) points within the active area. The orientation of beam paths is another aspect of the distribution. An (x, y) point that is derived from three beam paths that are all running roughly in the same direction usually will be a weaker distribution than a point that is traversed by three beam paths that all run at 60 degree angles to each other.

The concepts described above for emitters also applies to detectors. A detector's coverage area is the aggregate of all footprints for beams received by the detector.

Active Area Coverage. The coverage of the active area 131 depends on the shapes of the beam paths, but also depends on the arrangement of emitters and detectors. In most applications, the active area is rectangular in shape, and the emitters and detectors are located along the four edges of the rectangle. In a preferred approach, rather than having only emitters along certain edges and only detectors along the other edges, emitters and detectors are interleaved along the edges.

Multiplexing. Since multiple emitters transmit multiple optical beams to multiple detectors, and since the behavior of individual beams is generally desired, a multiplexing/demultiplexing scheme is used, including for example code division multiplexing, frequency division multiplexing and time division multiplexing. Several multiplexing techniques may be used together.

D. Processing Phase

In the processing phase 220 of FIG. 2, the transmission coefficients Tjk are used to determine the locations of touch points. Different approaches and techniques can be used, including candidate touch points, line imaging, location interpolation, touch event templates, multi-pass processing and beam weighting. These approaches are described briefly below and in further detail in U.S. patent application Ser. No. 13/059,817 "Method and Apparatus for Detecting a Multitouch Event in an Optical Touch-Sensitive Device" (attorney case 20019); and Ser. No. 13/460,703 "Detecting Multitouch Events in an Optical Touch-Sensitive Device Using Touch Event Templates" (attorney case 20601); which are incorporated herein by reference.

Candidate Touch Points. One approach to determine the location of touch points is based on identifying beams that have been affected by a touch event (based on the transmission coefficients Tjk) and then identifying intersections of these interrupted beams as candidate touch points. The list of candidate touch points can be refined by considering other beams that are in proximity to the candidate touch points or by considering other candidate touch points.

Line imaging. Line imaging is based on the concept that the set of beams received by a detector form a line image of the touch points, where the viewpoint is the detector's location. The detector functions as a one-dimensional camera that is looking at the collection of emitters. Due to reciprocity, the same is also true for emitters. The set of beams transmitted by an emitter form a line image of the touch points, where the viewpoint is the emitter's location. For convenience, the term "beam terminal" will be used to refer to emitters and detectors. Thus, the set of beams from a beam terminal (which could be either an emitter or a detector) form a line image of the touch points, where the viewpoint is the beam terminal's location. These line images are processed to determine the locations of the touch events. For example, processing based on correlation, computerized tomography and shadow casting can be used.

Location Interpolation. Applications typically will require a certain level of accuracy in locating touch points. One approach to increase accuracy is to increase the density of emitters, detectors and beam paths so that a small change in the location of the touch point will interrupt different beams. Another approach is to interpolate between beams, particularly beams that are wide enough to have an analog response.

Touch Event Templates. If the locations and shapes of the beam paths are known, which is typically the case for systems with fixed emitters, detectors and optics, it is possible to predict in advance the transmission coefficients for a given touch event. Templates can be generated a priori for expected touch events. The determination of touch events then becomes a template matching problem.

For templates, there is generally a tradeoff between selectivity and the number of templates. If very selective templates are used, a slight change in the touch contact area will no longer match a very selective template and therefore a larger number of templates is required to cover the expected possible touches. This increases the computational burden, although it produces more precise results. Less selective templates are more tolerant of changes in the contact area and usually are faster to match, but they produce less precise results. One approach uses series of templates, varying in selectivity.

Other templates will be apparent and templates can be processed in a number of ways. In a straightforward approach, the disturbances for the beams in a template are simply summed or averaged. This can increase the overall SNR for such a measurement, because each beam adds additional signal while the noise from each beam is presumably independent. In another approach, the sum or other combination could be a weighted process, where not all beams in the template are given equal weight. For example, the beams which pass close to the center of the touch event being modeled could be weighted more heavily than those that are further away. Alternately, the angular diversity of beams in the template could also be expressed by weighting. Angular diverse beams are more heavily weighted than beams that are not as diverse.

In a case where there is a series of N beams, the analysis can begin with a relatively small number of beams. Additional beams can be added to the processing as needed until a certain confidence level (or SNR) is reached. The selection of which beams should be added next could proceed according to a predetermined schedule. Alternately, it could proceed depending on the processing results up to that time. For example, if beams with a certain orientation are giving low confidence results, more beams along that orientation may be added (at the expense of beams along other orientations) in order to increase the overall confidence.

Beam Weighting. In processing the transmission coefficients, it is common to weight or to prioritize the transmission coefficients. Weighting effectively means that some beams are more important than others. Weightings may be determined during processing as needed, or they may be predetermined and retrieved from lookup tables or lists. Weighting can be based on different factors, including signal to noise ratio, angular diversity (i.e., beams traveling in different directions), spatial diversity (i.e., beams from diverse emitters/detectors) and the density of beams (i.e., whether many or few beams traverse a particular area). The weightings, however determined, can be used in the calculation of a figure of merit (confidence) of a given template associated with a possible touch location.

II. Power Saving

Especially for mobile devices, power consumption is an important factor. Touch-sensitive devices can be designed to operate in different modes and/or to use different schemes for detecting touches, which consume different amounts of power. The design of these modes and detection schemes, and the switching between them are important factors in determining the overall power consumption of a device.

A. Device Modes

Devices often can be operated in a number of different modes. FIG. 3 is a state diagram showing different modes and the transitions between modes. In FIG. 3, there are three basic types of modes: active 310, standby 320 and off/inactive 330. When the device is in active mode 310, there are ongoing touches and the device is actively determining the locations of touch events. This is the normal usage mode when the user is interacting with the device. When the device is in standby mode 320, there are not constant touches but the device is ready to enter active mode once touches start to occur. For example, the device may perform low level polling to determine the onset of touches. When the device is in off/inactive mode 330, the touch capability is disabled.

The transitions between modes depend on the device design. The following are some examples. The device may transition from active mode 310 to standby mode 320 in response to input from a user to enter standby mode or in response to the touch-sensitive device (or at least the touch-sensitive capability) being idle for a period of time (e.g., 5 minutes). Conversely, the device may transition from standby mode 320 to active mode 310 in response to input from a user to enter the active mode, in response to the sensing of touch activity, or in response to other triggers that indicate there may be touch activity soon (e.g., from software applications or from other user controls for the device).

The touch-sensitive assembly operates differently in different modes, thus conserving overall power. Typically, different detection scheme(s) will be used for different operating modes. When the touch-sensitive device transitions between two operating modes, the touch-sensitive device also transitions between detection schemes to use the detection scheme appropriate for the device's current operating mode. The detection scheme used for each operating mode balances the performance requirements of an operating mode with power consumption considerations. For example, the detection scheme(s) used in standby mode 320 may use less power but have lower accuracy/resolution and lower scan rate compared to the detection scheme(s) used in active mode 310, because the purpose of the standby mode detection schemes is to detect the presence of touch activity whereas the purpose of the active mode detection schemes is to locate the positions of touch events.

In one approach, the standby detection scheme is designed to detect a special gesture by the user indicating that the device should transition to active mode. For example, the special gesture may be a swipe from left to right across the touch sensitive surface within a certain area of the touch-sensitive surface. This swipe may include a number of individual touch events, starting with a touch event on the left side of the touch-sensitive surface and concluding with a touch event on the right side of the touch-sensitive surface. To detect the swipe, the detection scheme may periodically activate a limited set of beam terminals in a pattern designed to detect the presence (but not necessarily the exact location) of the left touch event. Once detected, the detection scheme may then change the beam pattern to detect a sequence of touch events moving to the right. This is a more limited detection scheme than one which is attempting to locate all touch events anywhere in the active area with good accuracy. Thus, it can be designed to consume less power.

One such special gesture at least one of begins in, ends in, and passes through a corner of the touch-sensitive surface. Generally, optical beams are shortest in length near the corners of the touch-sensitive surface due to the decreased distance between the emitters and detectors corresponding to those optical beams. Further, power required to achieve a given signal to noise ratio on each optical beam is proportional to the length of a given optical beam. Thus, short optical beams such as those near the corners consume less power to achieve a given signal to noise ratio than other longer beams not as near to the corners. As a result, a special gesture incorporating corner optical beams can save power. This is particularly advantageous in the standby detection scheme, where a limited set of beams including corner beams are activated to detect a wakeup gesture while consuming at little power as possible and while also achieving a desired signal to noise ratio.

Probably, no detection schemes are used in off/inactive mode 330. The device may transition to the off/inactive mode when it is turned off or if it is inactive for a long period of time. It could be that the touch capability is in the off/inactive mode while the rest of the device is not, for example if the touch-sensitive surface is not accessible but some other user input device is being used.

FIG. 3 shows additional modes. There may be variations of the active mode 310 and the standby mode 320, for example depending on whether the device is plugged in (310A,320A), running off battery (power-save modes 310B, 320B) or near the end of the battery life (survival modes 310C,320C). There may be additional modes depending on other operating conditions, for example use in bright light, use if the backlight is on, etc. Modes may also depend on application requirements. There may be a high-sensitivity mode or a high-speed mode or a mode that is specific to a software application.

Some operating modes may trade off power savings in favor of increased touch performance. For example, a high performance mode may be used when a software application requests high precision or high confidence touch location determination and/or a faster than normal sampling rate. The high performance detection scheme may activate most if not all beam terminals at a higher power and/or at a faster scan rate compared to the standard detection scheme used for active mode operation.

Software applications running on the touch-sensitive device may also make use of special detection schemes designed to take advantage of characteristics of the software application. These detection schemes may be based on additional information regarding the expected locations of touches. For example, a video game software application may expect touch events to be within certain predetermined areas on the touch sensitive surface. The detection scheme may activate beam terminals focused primarily on these areas, thus saving power. As another example, the application may expect touch events to be within a certain radius of the last touch event, as when a user is tracing a curve with his finger. Again, the detection scheme may use this additional information to selectively activate beam terminals.

As described above, different modes may use different detection schemes. Thus, power may be conserved by changing the detection scheme based on the operating mode.

B. Detection Schemes

Power may also be conserved by using different detection schemes within an operating mode. In FIG. 3, a number of different detection schemes may be available for use in active mode 310A (or in any of the other modes). These schemes can vary in their power requirements. By selecting various combinations of detections schemes and when to transition between schemes, the overall power consumption can be reduced.

There are a number of different parameters regarding the operation of the touch-sensitive device that can be changed to implement different detection schemes. These parameters include
  power or energy of the beam(s)
  the scan rate of the beam(s)
  which beam terminals are active, which impacts the scan area covered by the beam(s) and the density of beams within the scan area
  the type and configuration of the multiplexing scheme
  the type and configuration of the processing mechanism used to resolve touch events
  the sampling rate for touch events; and the number of beams, aggregate beam energy or aggregate beam power per touch event resolution Different detection schemes typically consume different amounts of power. Each detection scheme may be intended for a different purpose, and therefore may have a different expected range of power consumption. For example a low power detection scheme may save power at the expense of speed, error rate or resolution. A high power detection scheme may have increased performance, but at the expense of power consumption. Even within an operating mode, the touch-sensitive device may implement one or more detection schemes and the detection schemes themselves may be adjustable or adaptive. Different detection schemes may also be used for different modes.

1. Beam Power/Energy

Beam power/beam energy affects overall power consumption. First, note that there are many measures of power/energy that can be used. Power/energy can be measured per beam (i.e., for each beam path between one emitter and one detector), per beam terminal (i.e., for all the beam paths in the coverage area of one beam terminal), or per touch event sample (i.e., for all beam paths required to make one sampling of touch events, which might include the same beam transmitted multiple times).

In addition, power is a good measure for actual power consumption by the device. For example, how long will the battery last may be determined based on actual power consumption, which in turn may be determined based on beam power. Energy is a good measure for efficiency. For example, the amount of energy is required per touch event sample and the number of touch event samples per second may be combined to determine efficiency. A particular detection scheme may have low energy consumption per touch event sample, but high power consumption because it is sampling touch events at a fast rate.

Beam power/energy can be varied in different ways. One approach is to increase the voltage or current supplied to the emitter to increase the optical power of the beam. If the beam is on for a constant amount of time (i.e., constant duration pulse), the increase in power will also increase the beam energy. Beam energy can also be changed by varying the duration of the beam. A shorter duration beam (i.e., shorter pulse) will have lower energy, all things being equal.

Generally speaking, reducing the power/energy of a beam also reduces the corresponding signal-to-noise ratio at the detector. This increases the uncertainty in determining the corresponding transmission coefficient, which in turn increases the error rate in determining touch events. To achieve the same error rate using weaker beams, more beams generally are required. Conversely, increasing the strength of the beams increases the signal-to-noise ratio which generally means less beams are required, but there is a point of diminishing returns. Increasing the beam strength beyond a certain point produces excess signal-to-noise ratio that is only marginally beneficial. There often is an optimal tradeoff between the number of beams and the strength of the beams.

Figure 4A:
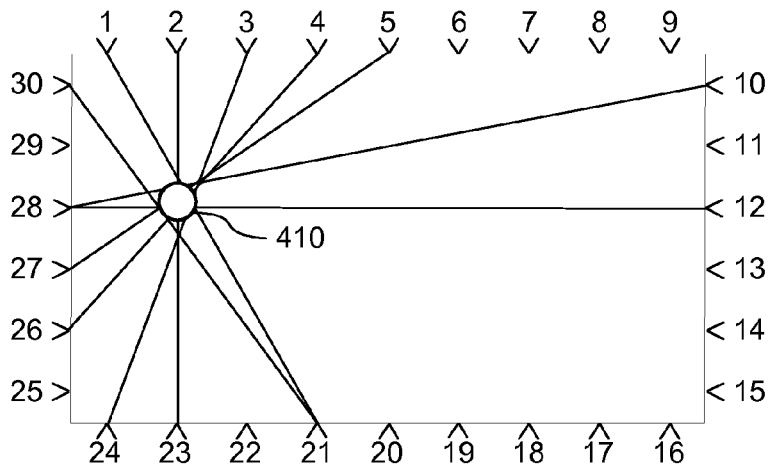
FIGS. 4A-C are diagrams illustrating the tradeoff between number of beams and energy per beam.
Figure 4B:
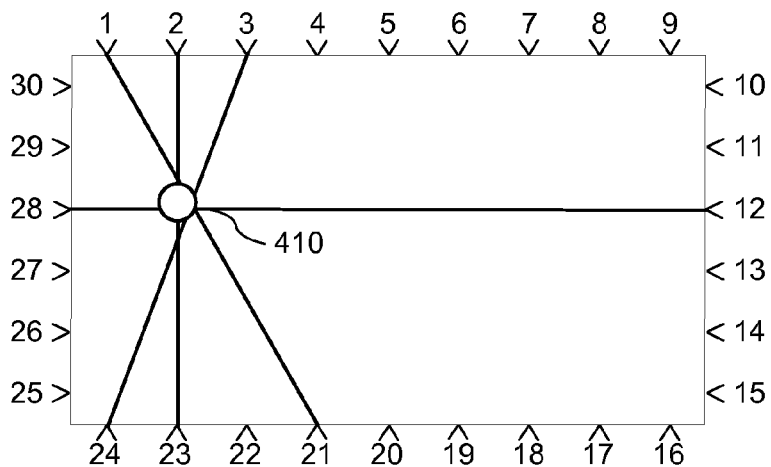
Figure 4C:
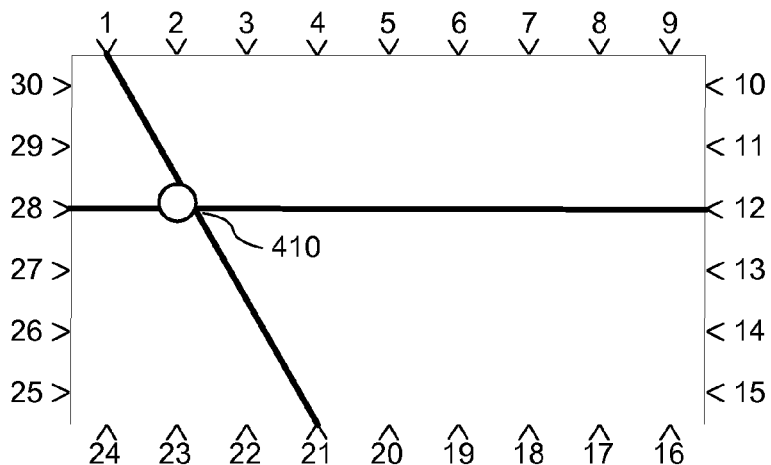

FIG. 4 illustrates this concept. Each of these figures shows a rectangular active area with beam terminals 1-30 arranged around its periphery. In this example, beam terminals are not labeled as emitter or detector. Assume that there are sufficient emitters and detectors to realize a beam path between any two beam terminals. In FIG. 4A, 8 beams of energy $E_0$ are used to determine touch point 410. There are 4 beams of energy $2E_0$ in FIG. 4B, and 2 beams of energy $4E_0$ in FIG. 4C. The total energy used in each of these cases is $8E_0$. In FIG. 4A, the energy $E_0$ per beam is too low for reliable estimation of whether an individual beam is blocked. Although there are 8 estimates of whether a beam is blocked, the overall detection is not so reliable because each of the 8 underlying estimates is not so reliable. In FIG. 4B, the energy $2E_0$ is sufficient to give reliable estimates of whether a beam is blocked. The four beams also gives good directional diversity. The result is a good estimate of whether a touch has occurred. In FIG. 4C, the energy $4E_0$ is also sufficient to give reliable estimates whether each beam is blocked, but not particularly better than the energy $2E_0$ and not good enough to compensate for going from four beams in FIG. 4B to only two beams in FIG. 4C with a corresponding loss in directional diversity. In this example, the approach shown in FIG. 4B gives the best results for the total energy of $8E_0$.

The touch-sensitive device adjusts the beam power/energy. This may include selecting different beam power/energy levels and/or pulse durations, determining when to make adjustments, and determining the amount of adjustment. The power/energy levels may be fixed, variable between discrete levels or continuously adjustable over a range of levels.

2. Beam Scan Rate

The scan rate of the beams also affects the overall power consumption. Different measures of scan rate can also be used: the scan rate per beam (e.g., how often each beam is used), the scan rate per beam terminal (e.g., how often each emitter/detector is used), the scan rate for all beams (e.g., the average number of beams scanned per unit time, or the average number of beams scanned per touch event sample).

Assuming constant energy consumption per scan, lower scan rates typically mean lower power consumption. If each scan consumes an energy of $E_0$, then doubling the scan rate will roughly double the power consumption. Conversely, if power consumption is constant, then lower scan rates typically mean higher energy per scan and therefore more reliable results. If scans consume power at a rate $P_0$, then doubling the scan rate will roughly halve the amount of energy available per scan. This assumes constant duty cycle. Varying the duty cycle will also vary the relation between power and energy.

3. Beam Angular Spread

The angular spread of beams can also be adjusted to affect overall power consumption and signal to noise ratio. For example, narrowing an emitter's radiant coverage (or angular spread) generally results in increased beam intensity within that radiant coverage for a given emitter power level. Increased intensity generally translates into a higher signal to noise ratio for the detector measuring that beam. Similarly, widening an emitter's radiant coverage generally results in decreased beam intensity within that radiant coverage for a given emitter power level. The same is true when instead considered from a detector's perspective. While reducing radiant coverage generally increases the beam's signal to noise ratio without consuming more power, a beam with reduced radiant coverage is typically less effective at unambiguously determining touch events. This is a result of the reduced surface area covered by the beam.

A number of different mechanisms may be used to adjust angular beam spread. For example, optical lenses, waveguides, and other optical manipulations of beams may be used to adjust the beams after emission and prior to reception by detectors. Alternatively, any given emitter or detector may be constructed using more than device, for example, an emitter may be constructed using more than one light emitting diode (LED). The LEDs may be oriented so that when narrower radiant coverage is to be used, fewer of the LEDs (e.g., 1) are activated. Conversely, where wider radiant coverage is to be used, additional LEDs (e.g., 3) are activated. The power levels of the activated LEDs in each case may sum to the same amount of total power consumed, though this may vary in practice.

A number of different mechanisms may be used to adjust angular beam spread. For example, optical lenses, waveguides, and other optical manipulations of beams may be used to adjust the beams after emission and prior to reception by detectors. Alternatively, any given emitter or detector may be constructed using more than device, for example, an emitter may be constructed of using than one light emitting diode (LED). The LEDs may be oriented so that when narrower radiant coverage is to be used, fewer of the LEDs (e.g., 1) are activated at higher power levels. Conversely, where wider radiant coverage is to be used, additional LEDs (e.g., 3) are activated at lower power levels. In this example, the power levels of the activated LEDs in each case sum to the same amount of total power consumed, though this may vary in practice.

Reducing radiant coverage is advantageous at least in part because the effect is multiplicative. For example, for a fourfold reduction in radiant coverage at the emitter and detector results in a sixteen fold increase in intensity in the detected signal within that reduced coverage, greatly improving the signal to noise ratio at little to no cost of additional power cost.

4. Activation of Beam Terminals

Which beam terminals (and how many beam terminals) are activated also affects power consumption. Beam terminals can have different levels of activation: active, standby and inactive, for example. A beam terminal is "active" when the beam terminal is transmitting or receiving a beam. A beam terminal is in "standby" when the beam terminal is drawing electrical power (e.g., the beam terminal is powered and is in the "on" state) but is not transmitting or receiving a beam. A beam terminal is "inactive" if it has been powered down.

Beam terminal states may correspond to the device's operating mode. When the device is inactive, the beam terminals can also be inactive. When the device is in standby mode, it is not actively taking touch event samples, but it may be polling periodically to determine when touch activity begins. In this case, most of the beam terminals may be in inactive or standby status, with a few beam terminals changing periodically to active status to poll for touch activity.

If touch activity is detected, the device transitions to active mode. Even when in active mode, beam terminals do not all have to be in active status all the time. Some may be in standby (or even inactive, depending on the startup time) in order to conserve power. For example, if time division multiplexing is used in active mode, different beams terminals are active during different time slots. When they are not active, they may be placed in standby or inactive status.

As another example, not all beam terminals need be active if touch event detection is focused on a subset of the entire active area. Alternately, it may be determined that only a subset of all beam terminals should be active in order to achieve a particular resolution for touch event detection. This is illustrated in FIG. 5.

Figure 5A:
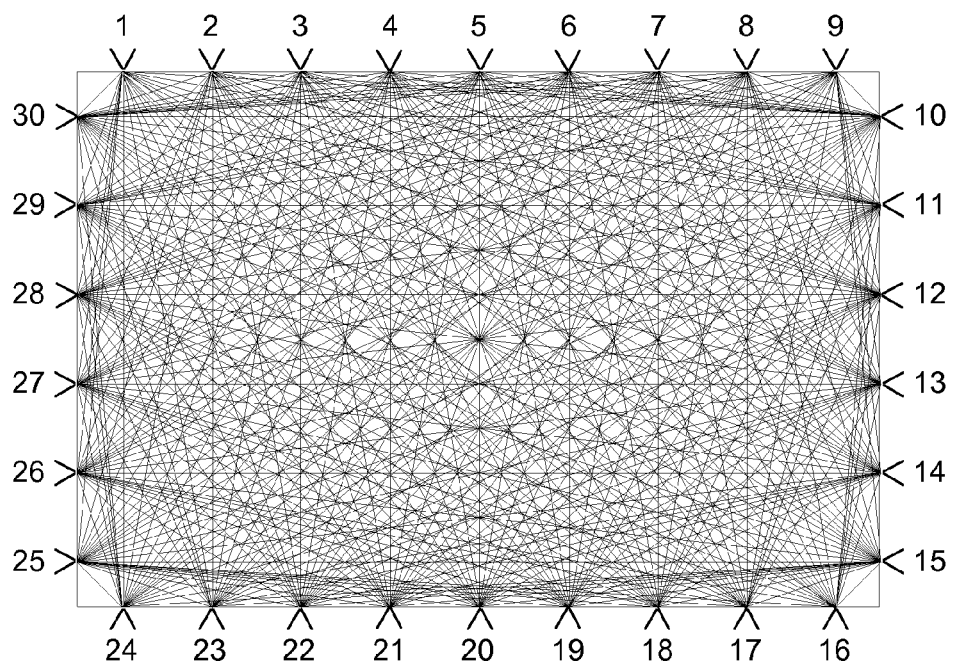
FIGS. 5A-C are diagrams illustrating different scenarios for activating beam terminals.
Figure 5B:
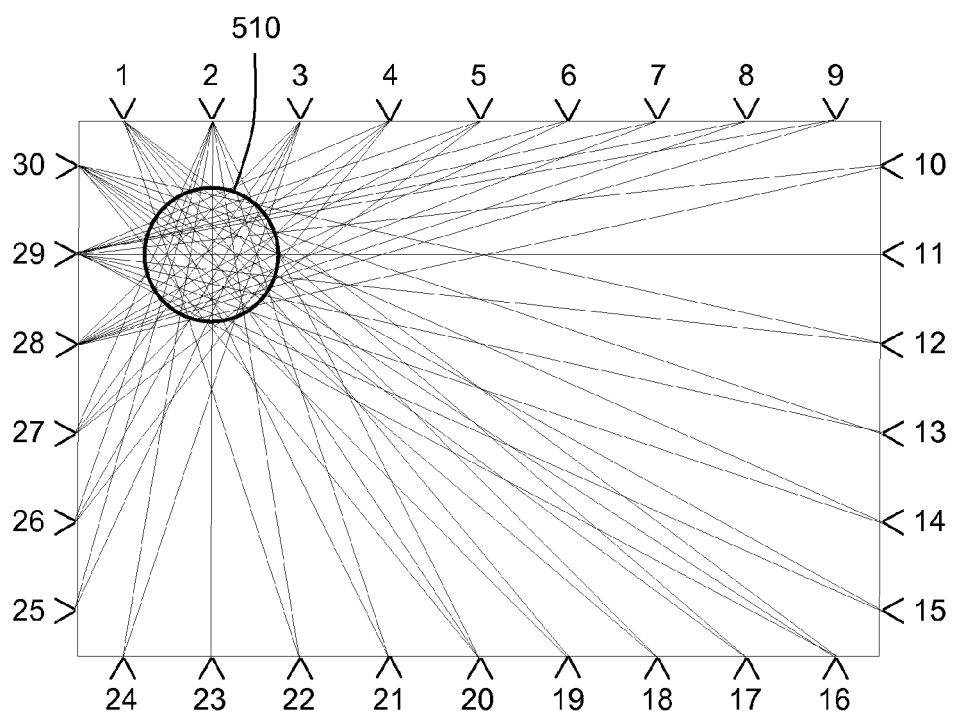
Figure 5C:
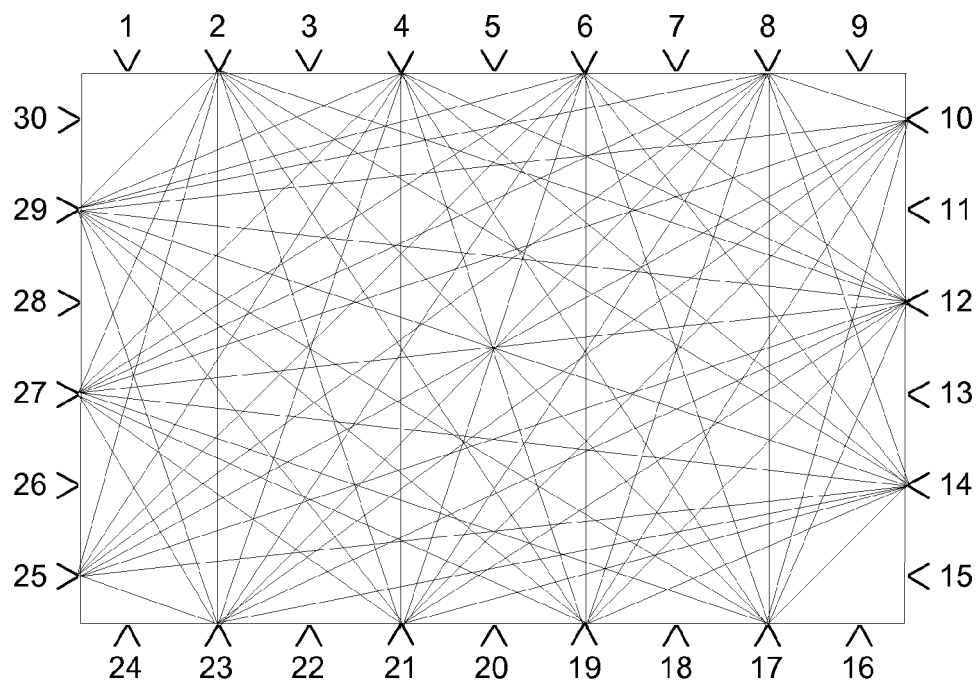

FIG. 5A shows a rectangular active area with beam terminals 1-30 arranged around its periphery, as in FIGS. 4A-C. In FIG. 5A, every possible beam path is active. There are a total of approximately 350 beam paths. In FIG. 5B, touch detection is localized to the circular area 510. The density of beams in FIG. 5B is the same as in FIG. 5A, but only over the localized area 510 so the total number of beams is much less. Here, there are only approximately 50 active beams compared to 350 in FIG. 5A. With more beam terminals, the difference will be even more significant. In FIG. 5C, touch detection is for the entire active area, but at a lower resolution. Approximately half the beam terminals are active, for a total of approximately 100 beam paths. The density of beams in FIG. 5C is lower than that of FIG. 5A.

In one approach, the low resolution scan of FIG. 5C is used to approximate the location of touches. This is followed by the higher resolution but localized scan of FIG. 5B to better resolve the location of touches. This approach can require less power using the full area, high resolution scan of FIG. 5A.

Another factor affecting power consumption is that beam terminals typically have startup and shutdown power costs associated with switching beam terminals between active and inactive states. Deactivating and reactivating a beam terminal may consume more power than leaving a beam terminal temporarily in the passively "on" state (e.g., standby state) for a certain period of time. Additionally, keeping current consumption relatively constant reduces power consumption relative to a case where current consumption varies more strongly, all other things being equal. For example, switching between having only a few beam terminals active to having a comparatively large numbers of beam terminals active consumes more power than activating and deactivating comparatively few beam terminals at a time.

In addition to saving power, selectively activating beam terminals can also decrease the processing time between when a touch occurs on the touch sensitive surface, and when the touch event is determined by the device. This is at least in part because reducing the number of beam terminals that are active for any given scan in turn reduces the complexity of any calculations performed to determine a touch event, which in some cases reduces the amount of time used to complete those calculations.

5. Multiplexing

As described above, different types of multiplexing may be used to allow beams from multiple emitters to be received by each detector. The type and configuration of the multiplexing scheme can affect overall power consumption.

Code division multiplexing and time division multiplexing are two schemes that may be used. Code division multiplexing requires the use of encoders and decoders, which consume electrical power. However, the encoding may increase noise rejection, so that the same signal-to-noise ratio may be achieved at lower beam strengths. Fast time division multiplexing may also increase power consumption by requiring fast switching of components. Thus, depending on the specific implementation, one or the other may be preferred from a power standpoint. In a hybrid approach, time division multiplexing and code division multiplexing may be used together. For example, less demanding detection schemes may use time division multiplexing, with code division multiplexing layered on top of that when more multiplexing is required.

Even within one type of multiplexing, the specific configuration may affect power consumption. For code division multiplexing, simpler codes may be used in less demanding situations, thus reducing the power required to encode and decode, for example.

6. Processing Techniques

The processing technique that is used to resolve touch events also affects power consumption. As described above, various processing techniques can be used. Power consumption will depend on which processing technique (or combination of processing techniques) is used, as well as the configuration for that processing technique. That is, the choice of using line imaging versus touch event templates will affect power consumption, as will the choice of what complexity template, how many templates, etc.

7. Touch Event Sampling

Many of the factors discussed above with respect to beams or processing also applies to touch event sampling. A touch event sample is one sampling of touch events. A single touch event sample may include multiple touch events. Device specifications often specify a minimum sample rate for touch event sampling. To produce a touch event sample, various beam patterns are transmitted over the active area. The detected beams are processed to determine a touch event sample. Thus, multiple beams are used to create a touch event sample.

Overall power consumption is affected by the sampling rate. If the sampling rate is doubled, then roughly twice as much power will be consumed (assuming that the process of beam generation, detection and processing is roughly independent of the sampling rate). Other factors affecting power consumption are the number of beams per touch event sample, the aggregate beam energy/beam power per touch event sample, and the aggregate processing energy/power per touch event sample.

C. Power Saving Using Multiple Detection Schemes

As described above, power can be conserved by changing detection schemes according to the operating mode of the device. Low power detection schemes can be used when the device is in standby mode, and no power detection schemes when the device is in inactive mode. Power consumption can also be reduced by switching between different detection schemes within an operating mode. The following description is for active mode. Similar techniques can also be used in other operating modes.

Figure 6:
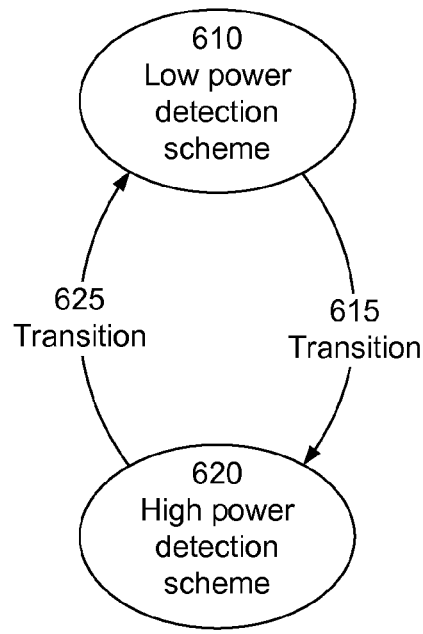
FIG. 6 is a state diagram illustrating switching between different detection schemes in active mode.

FIG. 6 is a generic state diagram illustrating the use of two detection schemes to reduce power consumption. Detection scheme 610 consumes less power. Detection scheme 620 consumes more power. The design of this system includes selection of the low power detection scheme 610, the high power detection scheme 620 and the transitions 615, 625 between the two schemes. The following discussions are largely with respect to power, but it should be understood that they also apply to energy. For example, the detection schemes in FIG. 6 could be a low energy detection scheme 610 and high energy detection scheme 620.

1. Power-Variant Detection Schemes

Figure 7A:
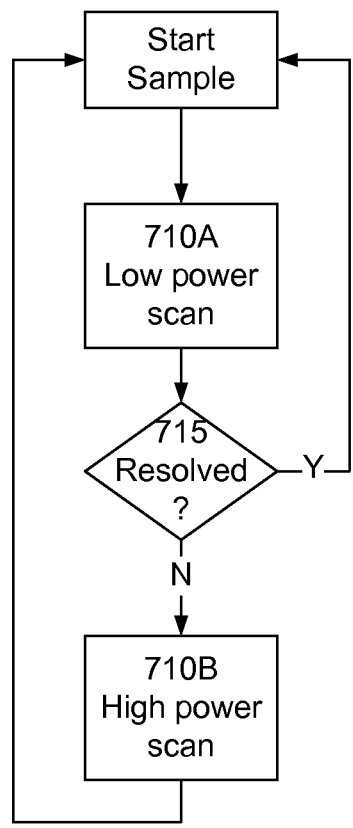
FIGS. 7A-D are flow diagrams illustrating examples based on the approach shown in FIG. 6.

In FIG. 7A, the touch-sensitive device dynamically switches between two detection schemes based on operating conditions. The touch-sensitive device uses the low power detection scheme 710A as the default. If the low power detection scheme is unable to resolve a touch event sample 715, the touch-sensitive device switches to a higher power variant 710B of the same detection scheme in that instance to resolve the touch event. It then returns to the low power detection scheme 710A for the next touch event sample. The high power detection scheme 710B is a variant of the low power detection scheme 710A that uses higher powers/energies for the beams. That is, touch events are sampled at a lower power setting. If that is not adequate, then the process is repeated but using more power.

Various factors may cause the low power detection scheme to be inadequate. An increase in ambient light may reduce the signal-to-noise ratio. The presence of oils, gloves or other materials on the touch-sensitive surface may degrade the performance. Certain types of touches may be more difficult to detect. Temperature variations and aging of components may also affect the performance of the touch-sensitive device.

In FIG. 7A, the inability to resolve a touch event using the low power detection scheme triggers the use of the high power detection scheme. A touch event may be unresolved if, for example, based on the transmission coefficients received as a result of a scan the touch sensitive device is unable to determine whether a touch event is present or is unable to determine the location of a touch event. These determinations may be made based on various factors including, for example, the signal to noise ratio being below a certain level, the uncertainty in the location of the touch event being above a certain level, the ambiguity in determining touch events being above a certain level and/or the confidence in determining touch events being below a certain level. The threshold level could be a predetermined quantity, it could be set by a calibration process, or it could be set adaptively based on the device's operation.

Various signal-to-noise measures may be used. It may be the signal-to-noise of individual beams, or it may be the signal-to-noise aggregated over multiple beams (e.g., all the beams used to determine a specific touch event). Signal-to-noise may be measured using transmission coefficients. For example, if the transmission coefficient of a fully blocked beam is not measurably different from the transmission coefficient of a fully or partially blocked beam, it may be determined that the signal to noise ratio is not sufficiently high.

Uncertainty in touch event location may be measured by the estimated area of the touch event. If a touch event location is determined based on measurements that are conflicting or ambiguous, it may be represented by an unusually large area since the area partially accounts for the uncertainty in the underlying measurements. The estimated area may be compared to the expected size of the touch event (e.g., relative to the expected contact area of a fingertip).

Confidence in the estimate of the touch event depends in part upon the processing technique used to resolve touch events. The processing technique may produce a confidence level, in addition to the estimate of the touch event. The confidence level may be expressed as a numerical value. For example, after processing, the touch-sensitive device may have determined that it is 70% confident that there is a touch event present at a given location. If the confidence is below a threshold, the high power detection scheme re-scans for the touch event. Confidence with respect to the presence of a touch event (as opposed to the location of a touch event) may also be used to disambiguate between multiple touches.

In the simple approach shown in FIG. 7A, the average energy $E_{ave}$ used per touch event sample is given by:

$$E_{ave} = E_{low} + Pr \, E_{high} \quad (1)$$

where $E_{low}$ is the energy consumed by the low power detection scheme, $E_{high}$ is the energy consumed by the high power detection scheme, and Pr is the probability that the low power detection scheme will be inadequate (i.e., the percentage of samples where the high power detection scheme is used). In one approach, $E_{high}$ is selected as the minimum energy required to resolve a significant majority if not all touch events. Energy above this minimum is just wasted. $E_{low}$ is then selected as the energy that minimizes $E_{ave}$. There is a tradeoff between $E_{low}$ and Pr. As $E_{low}$ approaches zero, Pr will approach 1 and $E_{ave}$ will approach $E_{high}$. As $E_{low}$ approaches $E_{high}$, Pr will approach 0 and $E_{ave}$ will approach $E_{high}$. Typically, some intermediate value of $E_{low}$ will minimize $E_{ave}$. As a numerical example, assume $E_{high}$=2 mJ and Pr is approximated as Pr=0.1/$E_{low}$ where $E_{low}$ is measured in mJ. Solving Eqn. 1 to minimize $E_{ave}$ yields $E_{low}$=0.45 mJ, Pr=22% meaning that the high power scan is used 22% of the time and $E_{ave}$=0.9 mJ.

The value of $E_{low}$ could be set at the factory, it could be set by a calibration process run by the user or run automatically by the device, or it could be set as part of the device's operation, for example based on a model of the overall process or adaptively based on the device's operation. In one approach, $E_{low}$ is changed slightly during normal operation. That is, $E_{low}$ is dithered. Changes which lead to better performance (e.g., lower $E_{ave}$) are accepted, thus adjusting $E_{low}$ over time. In another approach, an internal software model of the energy cost of each detection scheme and of Pr is used to select the value of $E_{low}$. The software model may be parameterized, with parameter values determined from measurements taken during device operation. Similar approaches can also be used to adjust $E_{high}$.

Figure 7B:
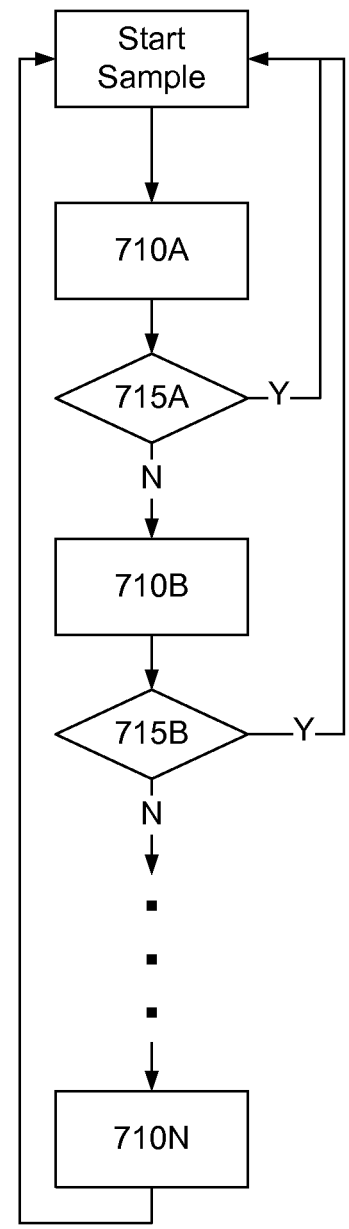
Figure 7C:
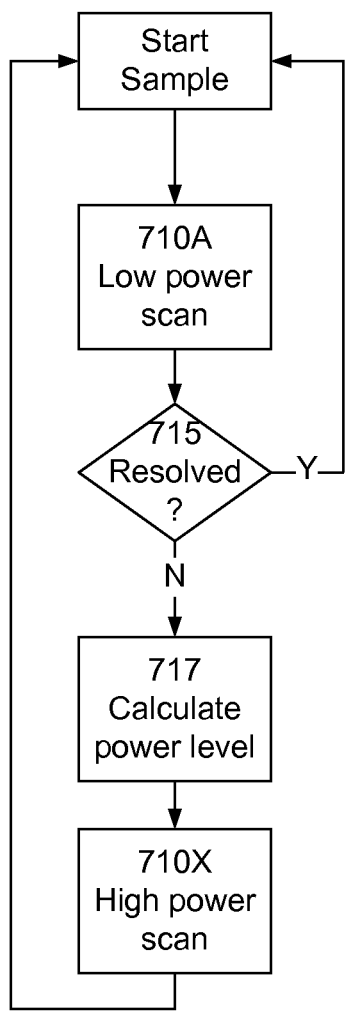
Figure 7D:
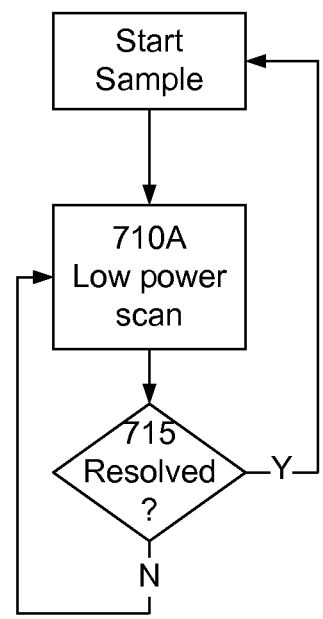

FIG. 7A shows an example where two detection schemes are used. FIGS. 7B-D show some other variations. In FIG. 7B, N detection schemes 710A-N of increasing power are used. In FIG. 7B, the detection schemes are cycled through sequentially. If detection scheme 710A fails 715A, then detection scheme 710B is run. If that fails 715B, then detection scheme 710C is run, etc. In an alternate approach, if detection scheme 710A fails, the next detection scheme is selected based on the degree of failure. For example, if detection scheme 710A has 80% confidence level then a slightly higher power detection scheme 710B is used; but if detection scheme 710A has 30% confidence level then significantly higher power detection scheme 710N is used immediately rather than first cycling through detection schemes 710B-M. In FIG. 7C, if detection scheme 710A fails, then rather than choosing between the discrete power levels of detection schemes 710B-N a specific power level is calculated 717 and the detection scheme 710X is run using this power level. FIG. 7D shows another alternative. If detection scheme 710A fails, it is run again, aggregating results with the previous run(s). This is repeated until sufficient signal-to-noise ratio is achieved.

2. Multi Pass Detection

In one implementation, the touch-sensitive device resolves touch events using multiple scan passes where each pass uses a different detection scheme. Multi pass detection can save power if the sum total of the energy consumed used to perform the multiple passes is less than would be needed to resolve touch events in a single pass.

Figure 8A:
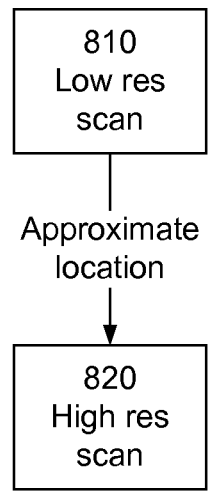
FIGS. 8A-B are flow diagrams illustrating examples of multi-pass approaches.

FIG. 8A illustrates an example of multi pass detection, where a first pass 810 determines an approximate location of a touch event and a second pass 820 more precisely determines the location of the touch event based on the touch location information provided by the first pass. In one implementation, the lower resolution detection scheme 810 uses a small number of beams or beam terminals. The beam terminals activated by this detection scheme are spread so as to be able to capture a touch event at any location in the active area, for example as described previously in FIG. 5C. This may be accomplished, for example, by activating only every Nth emitter and detector. This detection scheme is relatively efficient from a power consumption perspective. However, as a result, the location of the touch event is determined with relatively low precision.

Once the location of the touch event has been approximately determined using the lower resolution detection scheme 810, a higher resolution detection scheme 820 is performed using the touch location information from the first pass 810. The higher resolution detection scheme 820 may also make use of a small number of the beam terminals. The beam terminals activated by this detection scheme may be concentrated to provide a high resolution for the portion of the touch screen where the touch event was detected in the first scan, for example as described previously in FIG. 5B. Because the approximate location of the touch event is already known, the second pass need not scan the entire active area, and can instead be optimized for the local area where the touch event is known to be.

Figure 8B:
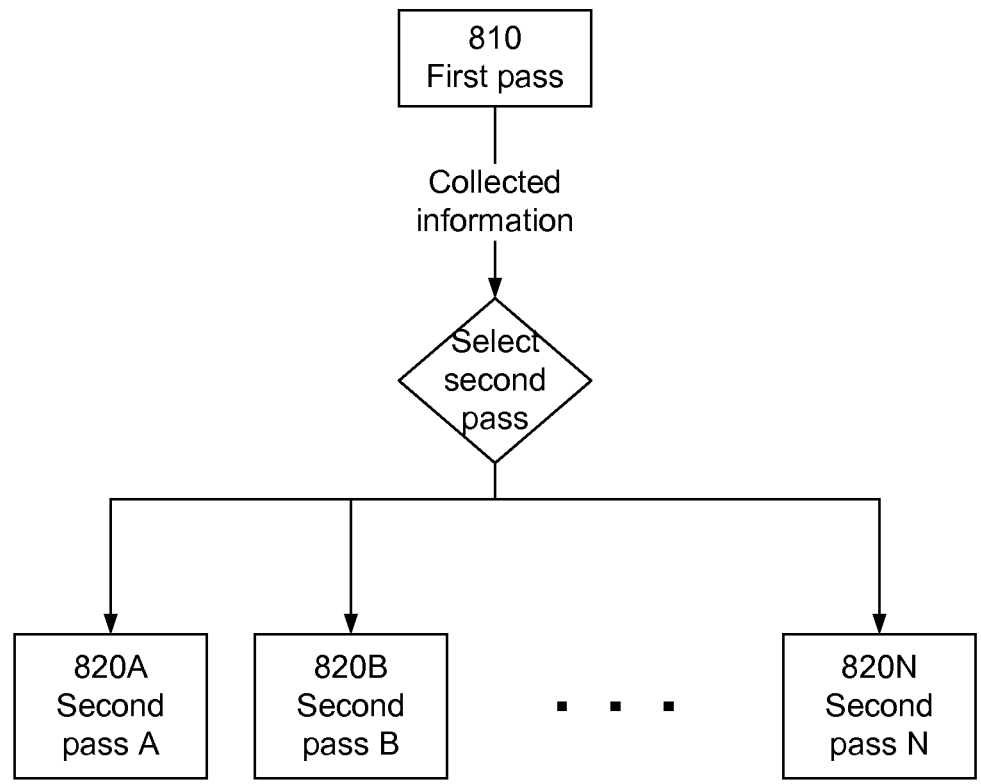

FIG. 8B shows another multi pass example. Here, a first detection scheme 810 gathers preliminary information that gives some information as to the locations of touch events but not enough to fully resolve the touch events. The selection of the second pass 820A-N depends on the information collected in the first pass 810. For example, if the first pass indicates a relatively simple touch situation, then a simpler more energy efficient second detection scheme 820A might be selected. If the first pass indicates two relatively close touch events, then a more complex detection scheme 820B designed to resolve close touch events may be selected, and so on.

Another multi pass example involves varying beam radiant coverage between passes in order to conserve power while improving the measured signal to noise ratio. In one embodiment, for a first pass of initial touch detection, a set of activated beams are adjusted to have a narrow radiant coverage. Upon detection of one or more touch events, this first pass generally will provide a set of possible touch locations. This set of possible touch locations may include ambiguities to be resolved. Subsequently, a second pass is performed where the same or a different set of activated beams are adjusted to have a wider radiant coverage compared to the first pass. Ideally the activated beams are chosen to correspond at least approximately with the set of possible touch locations from the first pass. After the second pass, the touch events are determined and any ambiguities are resolved. Alternative embodiments may use additional passes with wider or narrower radiant coverages, as well as different sets of activated beams in each pass.

3. Non-Homogeneous Detection Schemes

As another power-saving approach, knowledge about the distribution of touch events may be used to design detection schemes. For example, it may be known that most touch events occur near the center of a touch-sensitive device. For example, it may be known that more than 25% percent of touches occur within the center 25% of the active area. A corresponding detection scheme(s) emphasizes the center area at the expense of the periphery.

One detection scheme may scan the center hotspot with higher power, higher scan rate and/or higher resolution. A second detection scheme scans the periphery with lower power, lower scan rate and/or lower resolution. The two detection schemes may be implemented sequentially or simultaneously (if possible). A detection scheme may also use a graded approach, where the power, scan rate or resolution varies in a continuous fashion from the center hotspot outwards to the other areas.

The hotspot can be areas other than the center of the active area. The location of frequently used user controls is one example. This may vary depending on what applications are being used. The hotspots may also change over time. For example, if a user is typing, hotspots may be located based on which letters are likely to be typed next. By using a detection scheme that concentrates where touches are more likely to occur, overall power/energy consumption can be reduced.

D. Power Saving with Adaptation

In another aspect, the touch-sensitive device receives feedback regarding the success or failure of touch event resolution. The feedback can be used to adjust both the detection schemes and/or their relative usage. As a result, the touch-sensitive device is able to reduce the occurrence of errors in touch event resolution while still also reducing overall power consumption.

Using FIG. 7A as an example, the approach of FIG. 7A uses a low power detection scheme and a high power detection scheme. The low power detection scheme consumes less power but has a higher chance of producing an error (i.e., being unable to resolve a touch event correctly). The touch-sensitive device receives feedback regarding the outcome of each scan for a touch event, including, for example, the detection scheme used, the power consumed by the scan, and whether or not an error occurred as a result of the scan. This feedback is used to adjust the detection schemes.

For example, if a large number of errors are occurring with the low power detection scheme, this will result in a large number of higher power scans, resulting in higher total power consumption. Increasing the power of the low power detection scheme may reduce the number of errors and the number of higher power scans, thereby lowering total power consumed.

In contrast, if relatively few errors are occurring with the low power detection scheme, this may indicate that the low power detection scheme is consuming more power than necessary. In this case, the power of the low power detection scheme may be reduced. Subsequent feedback may indicate whether or not this reduction has reduced total power consumption. The high power detection scheme may be similarly adjusted upward or downward in power.

The determination of whether to adjust a detection scheme, and to what extent, may be based on a number of factors. The determination may be made based on the number of high power and low power scans (e.g., the ratio between the two). For example, it may be determined that if the ratio of high power to low power scans exceed 0.5:1, the power of the low power scan should be increased. The determination to adjust a detection scheme may also be made when a fixed number of errors or high power scans occur.

The scans under consideration for use in determining whether to adjust a detection scheme may vary depending upon the implementation. In one implementation, all scans that have occurred since the last change to a detection scheme are considered. In another implementation, the scans under consideration are those within a moving time window, so that older scans of possibly lower relevance are not considered. In one embodiment, only a fixed number of the most recent scans are considered.

Additionally, errors in the resolution of a touch event are not necessarily binary. The adjustment determination for a power level may take into account confidence levels. For example, if a touch event has been determined with 40% certainty, the percent certainty may be incorporated into the determination of whether or not an error occurred. The confidence may be used as a weighting factor for a scan's contribution to the adjustment determination.

As above, detection schemes may be adjusted by changing a number of different mechanisms, including the power level of beam terminals, which beam terminals are active, the scan rate, and the processing technique. In the case of the power level of beam terminals, the power level may be adjusted at a fixed incremental amount, a predetermined amount, or a dynamic amount based on the feedback received.

The adjustment approaches described above may also be applied to the other power-saving approaches described herein, and are not limited to the example of FIG. 7A.

V. Applications.

The touch-sensitive devices described above can be used in various applications. Touch-sensitive displays are one class of application. This includes displays for tablets, laptops, desktops, gaming consoles, smart phones and other types of compute devices. It also includes displays for TVs, digital signage, public information, whiteboards, e-readers and other types of good resolution displays. However, they can also be used on smaller or lower resolution displays: simpler cell phones, user controls (photocopier controls, printer controls, control of appliances, etc.). These touch-sensitive devices can also be used in applications other than displays. The "surface" over which the touches are detected could be a passive element, such as a printed image or simply some hard surface. This application could be used as a user interface, similar to a trackball or mouse.

VI. Additional Considerations

The figures depict embodiments of the present invention for purposes of illustration only. One skilled in the art will readily recognize from the following discussion that alternative embodiments of the structures and methods illustrated herein may be employed without departing from the principles of the invention described herein.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for resolving touch events on a surface, the surface having emitters and detectors arranged around its periphery, the emitters producing optical beams received by the detectors, the touch events disturbing the optical beams, the method comprising:
   scanning for touch events using a lower power detection scheme that includes determining transmission coefficients for pairs of emitters and detectors;
   determining whether a touch event is present when scanning using the lower power detection scheme;
   computing, based on the transmission coefficients, a numerical measure of confidence in the determination of whether the touch event is present when scanning using the lower power detection scheme;
   determining that the computed measure of confidence is lower than a specified confidence threshold;
   responsive to the determination, scanning for the touch events using a higher power detection scheme; and
   determining presence of one or more of the touch events based upon the higher power detection scheme scan.

2. The method of claim 1 wherein in comparison to the lower power detection scheme, the higher power detection scheme is configured to determine touch events with comparatively greater confidence.

3. The method of claim 1 wherein the numerical measure of confidence is based on a signal to noise ratio of an individual optical beam received by one of the detectors.

4. The method of claim 1 wherein the numerical measure of confidence is based on an aggregate signal to noise ratio of a plurality of the optical beams received by a plurality of the detectors.

5. The method of claim 1 wherein in comparison to the lower power detection scheme, the higher power detection scheme is configured to determine touch events with comparatively greater precision in location on the surface.

6. The method of claim 1 wherein in comparison to the lower power detection scheme, the higher power detection scheme is configured to determine touch events with comparatively greater precision in sizes of touch events on the surface based on expected sizes of the touch events.

7. The method of claim 1 wherein the higher power detection scheme is configured to consume sufficient power to determine at least a significant majority of expected touch events, and the lower power detection scheme is configured to consume sufficient power to minimize an average power to resolve touch events, the average power being computed across a plurality of different scanning instances of the lower and higher power detection schemes and that resolved the touch events, relative to a number of the resolved touch events.

8. The method of claim 7 wherein an amount of power consumed by the lower power detection scheme is dynamically incremented and decremented over time during use of the device in order to minimize the average power.

9. The method of claim 1 wherein parameters of the lower power detection scheme are dynamically adjusted during use of the device.

10. The method of claim 1 comprising:
    scanning for touch events using an intermediate power detection scheme configured to consume more power than the lower power detection scheme, and less power than the higher power detection schemes; and
    upon a determination that both the lower power detection scheme and the intermediate power detection scheme were inadequate to determine touch events, scanning for touch events using the higher power detection scheme.

11. The method of claim 1 comprising:
    generating the higher power detection scheme based upon a result of the scan using the lower power detection scheme, the higher power detection scheme calculated to consume sufficient power to determine touch events.

12. The method of claim 1 wherein the higher power detection scheme and the lower power detection scheme differ in power consumption with respect to at least one from the group consisting of:
    power levels of the emitters and detectors,
    scan rates of the emitters and detectors,
    activations of the emitters and detectors,
    multiplexing of the optical beams produced by emitters and received by detectors, and
    a sampling rate of the emitters and detectors.

13. The method of claim 1 wherein the at least one of the higher and lower power detection schemes scans a center area of the surface with at least one from the group consisting of a higher power, a higher scan rate, and a higher resolution in comparison to a periphery of the surface.

14. The method of claim 1, wherein the transmission coefficients each include a value and an associated uncertainty, and the numerical measure of confidence is based on uncertainties of transmission coefficients of the touch event scans obtained from the lower power detection scheme.

15. A method for resolving touch events on a surface, the surface having emitters and detectors arranged around its periphery, the emitters producing optical beams received by the detectors, the touch events disturbing the optical beams, the method comprising:
    over a plurality of different scanning instances:
       scanning for events using a lower power detection scheme;
       for a subset of the instances:

determining that the lower power detection scheme was inadequate to resolve the touch events, and scanning for the touch events using a higher power detection scheme, and determining touch events based upon the higher power detection scheme scan; and adjusting mechanisms of the lower power detection scheme based on feedback regarding a proportion of scans acquired using the higher power detection scheme during the different instances to determine the touch events.

16. The method of claim 15, wherein the feedback comprises a number of touch events determined using the higher power detection scheme.

17. The method of claim 15, wherein the feedback comprises a number of touch events determined using the lower power detection scheme.

18. The method of claim 15, wherein the feedback comprises a ratio of a first number of touch events determined using the higher power detection scheme to a second number of touch events determined using the lower power detection scheme.

19. The method of claim 15, wherein the feedback is based on different scanning instances having occurred since a prior adjustment to the lower power detection scheme.

20. The method of claim 15, wherein the feedback is based on different scanning instances having occurred within a moving time window.

21. The method of claim 15, wherein the feedback is based on a confidence in the determination of the touch events by the lower power detection scheme.

22. An optical touch-sensitive device capable of resolving touch events comprising:

a surface on which touch events are to be detected;

emitters and detectors arranged around a periphery of the surface, the emitters producing optical beams received by the detectors, the touch events disturbing the optical beam; and a touch event processor coupled, directly or indirectly, to the emitters and detectors, the touch event processor receiving information indicating which beams have been disturbed by touch events and configured to:

control activation of the emitters and detectors to scan for touch events using a lower power detection scheme;

resolve a first set of the touch events using the lower power detection scheme;

determine that the lower power detection scheme was inadequate to determine a second set of the touch events with at least a required confidence;

control activation of the emitters and detectors to scan for touch events using a higher power detection scheme; and attempt to resolve the second set of the touch events based upon the higher power detection scheme scan, wherein the higher power detection scheme is configured to consume sufficient power to resolve at least a threshold proportion of the second set of the touch events, and the lower power detection scheme is configured to consume sufficient power to minimize an average power to resolve touch events.

23. The method of claim 22, wherein the average power is computed across a plurality of different scanning instances of the lower and higher power detection schemes that resolved the touch events.

24. The method of claim 2, wherein the average power is computed by multiplying a probability that the lower power detection scheme will fail to resolve a touch event by a first power consumed by attempting to resolve the touch event using the lower power detection scheme and adding a second power consumed by attempting to resolve the touch event using the higher power detection scheme.

* * * * *